(12) United States Patent
Lin

(10) Patent No.: US 8,665,589 B2
(45) Date of Patent: Mar. 4, 2014

(54) PERIPHERAL INPUT DEVICE

(75) Inventor: Chi-Cheng Lin, Taoyuan County (TW)

(73) Assignee: BenQ Corporation, Taipei (TW)

( * ) Notice: Subject to any disclaimer, the term of this patent is extended or adjusted under 35 U.S.C. 154(b) by 213 days.

(21) Appl. No.: 13/360,794

(22) Filed: Jan. 29, 2012

(65) Prior Publication Data

US 2013/0128453 A1    May 23, 2013

(30) Foreign Application Priority Data

Nov. 18, 2011    (TW) .............................. 100142443 A

(51) Int. Cl.
*G06F 1/16*    (2006.01)

(52) U.S. Cl.
USPC .................................................... 361/679.41

(58) Field of Classification Search
USPC ............................ 361/679.41, 679.09, 679.56
See application file for complete search history.

(56) References Cited

U.S. PATENT DOCUMENTS

| | | | | |
|---|---|---|---|---|
| 5,253,139 | A * | 10/1993 | Satou ......................... | 361/679.09 |
| 6,108,200 | A * | 8/2000 | Fullerton .................. | 361/679.12 |
| 6,496,365 | B2 * | 12/2002 | Tsai ............................ | 361/679.4 |
| 6,538,642 | B2 * | 3/2003 | Tsai .............................. | 345/168 |
| 6,561,708 | B2 * | 5/2003 | Lin ............................... | 400/495 |
| 6,672,558 | B2 * | 1/2004 | Li ................................. | 248/463 |
| 6,700,775 | B1 * | 3/2004 | Chuang et al. ........... | 361/679.01 |
| 6,714,404 | B1 * | 3/2004 | Wu ........................... | 361/679.09 |
| 6,882,524 | B2 * | 4/2005 | Ulla et al. ................ | 361/679.09 |
| 6,937,468 | B2 * | 8/2005 | Lin et al. .................. | 361/679.41 |
| 6,940,713 | B2 * | 9/2005 | Huang et al. ............. | 361/679.09 |
| 6,986,492 | B2 * | 1/2006 | Huang et al. ............. | 248/346.03 |
| 7,068,496 | B2 * | 6/2006 | Wong et al. .............. | 361/679.28 |
| 8,089,760 | B2 * | 1/2012 | Yi-Chang ................ | 361/679.59 |
| 8,472,168 | B2 * | 6/2013 | Su ............................. | 361/679.01 |
| 2003/0095380 | A1 * | 5/2003 | Chen et al. ..................... | 361/686 |

* cited by examiner

*Primary Examiner* — Lisa Lea Edmonds

(57) ABSTRACT

A peripheral input device capable of carrying a tabular electronic device is disclosed. The peripheral input device includes a base, an inputting module, a supporting mechanism, and a retaining structure. The inputting module, the supporting mechanism, and the retaining structure are disposed on the base. The retaining structure is disposed between the inputting module and the supporting mechanism. The supporting mechanism can provide a plurality of supporting angles for supporting the tabular electronic device stably with the retaining structure. Therefore, the peripheral input device according to the invention can provide functions of supporting and inputting simultaneously, provide a plurality of supporting angles for satisfying view demand of a user to the tabular electronic device during operation, and further can be regarded as a protection cover for the tabular electronic device.

20 Claims, 14 Drawing Sheets

PERIPHERAL INPUT DEVICE

BACKGROUND OF THE INVENTION

1. Field of the Invention

The invention relates to an input device, and especially relates to a peripheral input device capable of carrying a tabular electronic device.

2. Description of the Prior Art

Tablet computers are very popular in the consumption market because of their properties of light weight and portability. The tablet computer is limited by its volume to be provided without a physical keyboard, so the inputting interface is performed directly by the touch control function of the screen thereof. In this inputting way, the feeling of pressing a virtual keyboard is not good; besides, because of displaying the virtual keyboard, the residual area of the screen for displaying images decreases greatly. For example, in a word processing application, maybe only few lines of text can be seen, which is very inconvenient. In addition, when a user needs to use both hands for inputting, the tablet computer usually lies on a tabletop leading to the fact that the user may need to manipulate the tablet computer in an unnatural posture, or the tablet computer is leaned against some object for obtaining a better operation view but the table computer is uneasy to be supported stably leading to possible falling and damage to the tablet computer. In another scenario of using both hands, the user can use an external keyboard so as to obtain good touch feeling without decreasing the area for displaying images. However, the supporting for the tablet computer is still a problem. Currently, there are various external keyboards having supporting function on the market, so as to provide better pressing feeling and supporting, but the external keyboard with supporting structure usually provide only one single supporting angle for the tablet computer. Obviously, the single supporting angle cannot satisfy the view demand of every user to the tabular computer. It is still inconvenient in usage.

SUMMARY OF THE INVENTION

An objective of the invention is to provide a peripheral input device, which uses a supporting mechanism and a retaining structure to support a tabular electronic device in various supporting angles so as to satisfy the view demand of every user to the tabular computer.

The peripheral input device is capable of carrying a tabular electronic device. The tabular electronic device has a bottom and a back casing. The peripheral input device includes a base, an inputting module, a supporting mechanism, and a retaining structure. The base has a surface. The inputting module is disposed on the surface for allowing a user input data to the tabular electronic device. The supporting mechanism includes a support and a slip stopper. The slip stopper has a designated contact surface. A lower end portion of the support is pivotally connected to the base. An upper end portion of the support is pivotally connected to the slip stopper, such that the slip stopper is capable of rotating on the upper end portion. The retaining structure is disposed between the inputting module and the supporting mechanism. When the bottom of the tabular electronic device is retained by the retaining structure, and the support is lifted by pivoting upward on the lower end portion, the slip stopper is rotated to fit an inclination angle of the back casing so that the slip stopper keeps contacting the back casing through the designated contact surface when the inclination angle of the back casing changes, and the support and the tabular electronic device form a reverse V-shaped structure to support the tabular electronic device stably.

Therefore, the peripheral input device uses the pivotal connection of the slip stopper to fit the inclination angle of the back casing so that the slip stopper can be attached closely onto the back casing. The support and the tabular electronic device therefore form a stable structure to support the tabular electronic device stably. The view demands of users to the tabular electronic device are therefore satisfied. Furthermore, the peripheral input device uses the inputting module, for example a keyboard to provide better manipulation feeling to users. In addition, the base can further include a hinge. The base is capable of being pivotally connected to the tabular electronic device through the hinge, so that the peripheral input device can substantially flatly cover the tabular electronic device so as to be regarded as a protection cover for the tabular electronic device.

Another objective of the invention is to provide another peripheral input device, which also uses a supporting mechanism and a retaining structure to support a tabular electronic device in various supporting angles so as to satisfy the view demand of every user to the tabular computer.

The peripheral input device is capable of carrying a tabular electronic device. The tabular electronic device has a bottom and a back casing. The peripheral input device includes a base, an inputting module, an accommodating recess, a supporting mechanism, and a retaining structure. The base has a surface. The inputting module is disposed on the surface for allowing a user input data to the tabular electronic device. The accommodating recess is formed on the surface and defines a surrounded area. The supporting mechanism includes a first support, a second support, and a positioning mechanism. A first lower end portion of the first support is pivotally connected to the base. A second upper end portion of the second support is pivotally connected to the first support; a second lower end portion of the second support is selectively fixed in the positioning mechanism. The positioning mechanism is disposed within the surrounded area. The retaining structure is disposed between the inputting module and the supporting mechanism. When the bottom of the tabular electronic device is retained by the retaining structure, the first support is lifted by pivoting upward on the first lower end portion, and the second lower end portion is fixed in the positioning mechanism, the tabular electronic device is supported stably by the base and a first upper end portion of the first support. Therein the first support includes at least a U-shaped or L-shaped structure. When the first support pivots downward on the first lower end portion so that the first support is accommodated in the accommodating recess, the second support is surrounded on at least two sides by the first support.

Therefore, the peripheral input device uses the positioning mechanism so that the first support and the second support form the stable supporting structure. Besides, the positioning mechanism can provide various fixing positions to the second supports that the tabular electronic device can be disposed in various inclination angles so as to satisfy the view demands of users to the tabular electronic device. In addition, similarly, the peripheral input device uses the inputting module, for example a keyboard to provide better manipulation feeling to users. The base can further include a hinge. The base is capable of being pivotally connected to the tabular electronic device through the hinge, so that the peripheral input device can substantially flatly cover the tabular electronic device so as to be regarded as a protection cover for the tabular electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
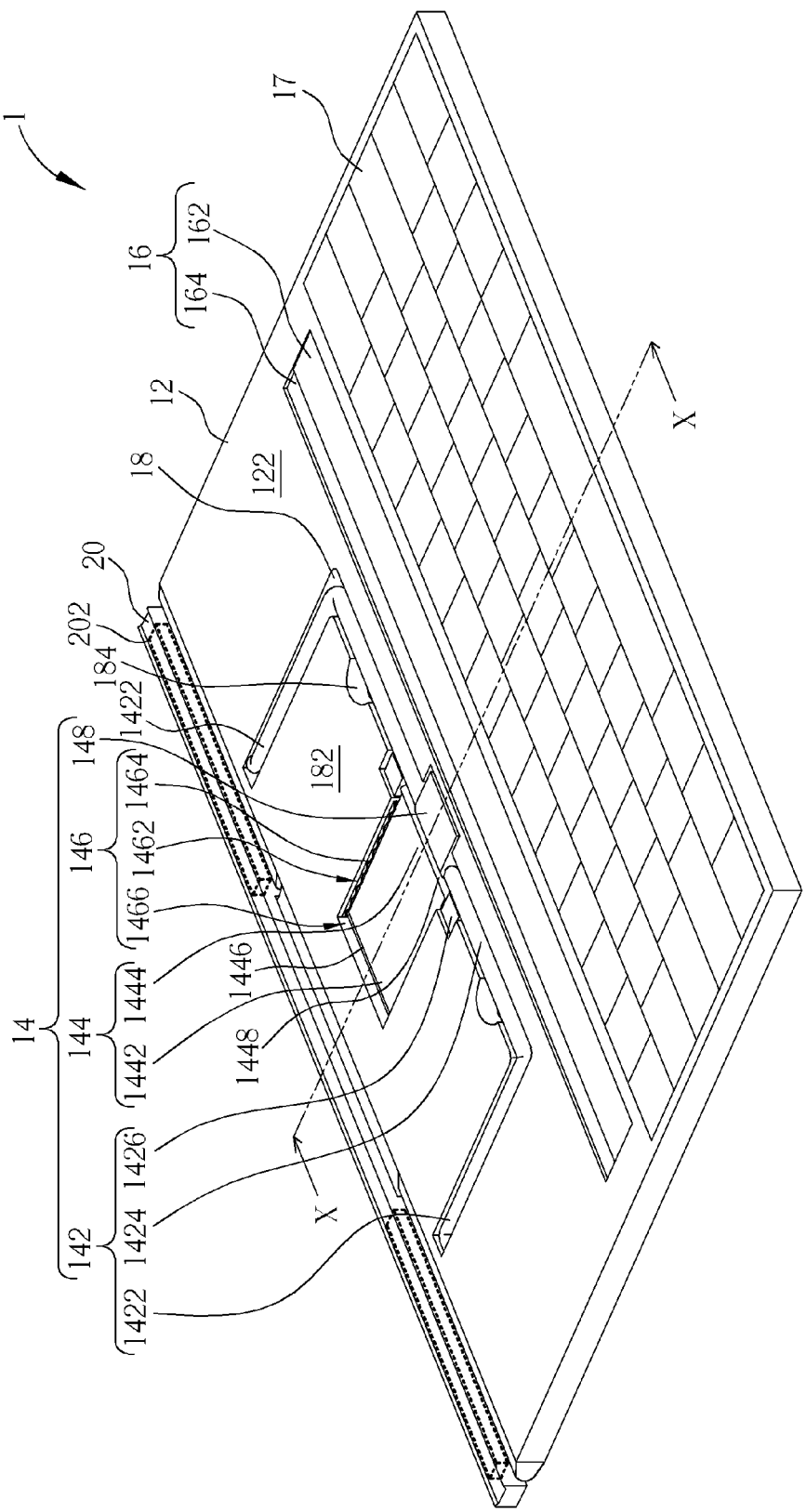
FIG. 1 is a schematic diagram illustrating a peripheral input device of a preferred embodiment according to the present invention.
Figure 2:
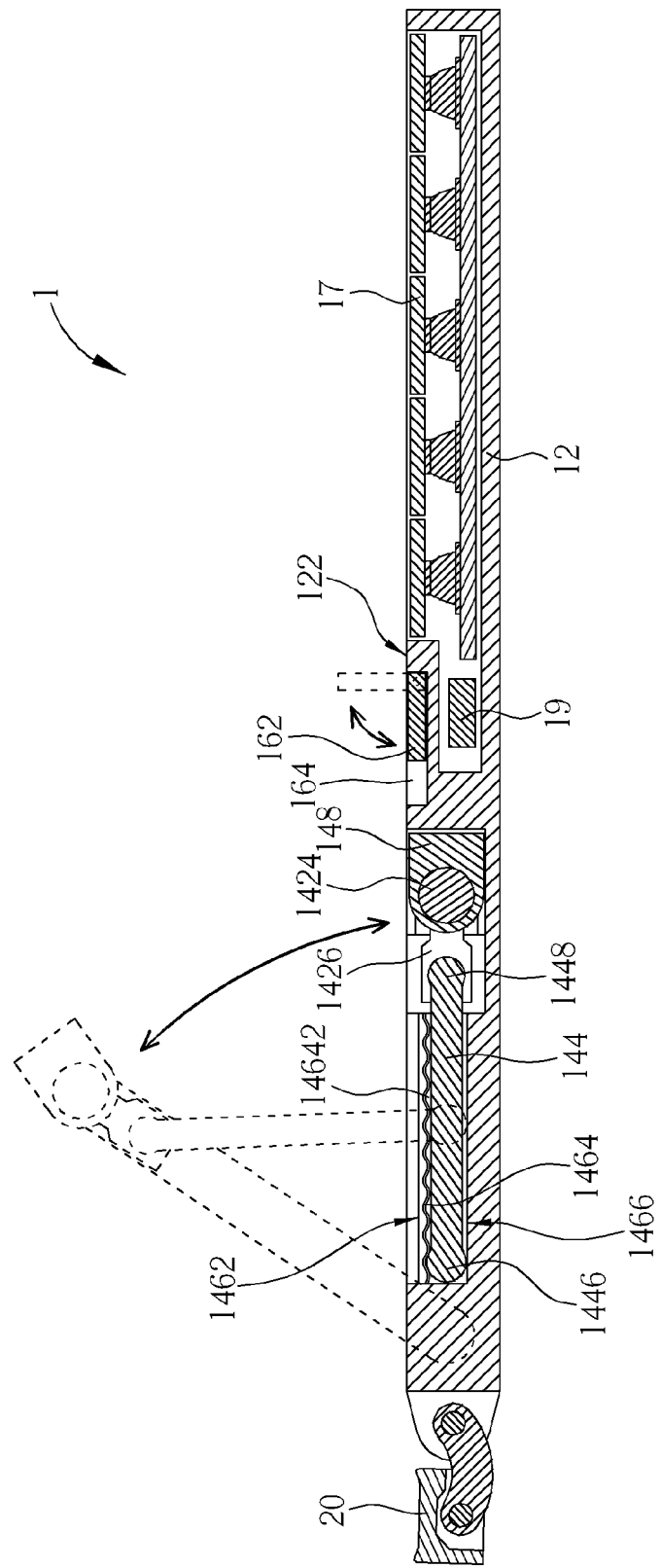
FIG. 2 is a sectional view of the peripheral input device along the line X-X in FIG. 1.

Please refer to FIG. 1 and FIG. 2. FIG. 1 is a schematic diagram illustrating a peripheral input device 1 of a preferred embodiment according to the present invention. FIG. 2 is a sectional view of the peripheral input device 1 along the line X-X in FIG. 1. The peripheral input device 1 includes a base 12, a supporting mechanism 14, a retaining structure 16, and an inputting module 17. A first accommodating recess 18 is formed on a surface 122 of the base 12 and defines a surrounded area 182, i.e. the area surrounded by the U-shaped first accommodating recess 18. The supporting mechanism 14 includes a first support 142, a second support 144, a positioning mechanism 146, and a slip stopper 148.

The first support 142 has two first lower end portions 1422 and a first upper end portion 1424. The first lower end portions 1422 are pivotally connected to the base 12. The slip stopper 148 is pivotally connected to the first upper end portion 1424, such that the slip stopper 148 is capable of rotating on the first upper end portion 1424. The slip stopper 148 has a designated contact surface 1482. In the embodiment, the first support 142 is U-shaped and has two vertical arms and a horizontal arm. The first upper end portion 1424 corresponds to the horizontal arm. The slip stopper 148 is pivotally connected to the horizontal arm and capable of rotating around the horizontal arm. The first support 142 is capable of pivoting downward on the first lower end portions 1422 so that the first support 142 and the slip stopper 148 can be accommodated in the first accommodating recess 18. In addition, the accommodating recess 18 includes two pulling-out operation spaces 184 for a user to easily take out the first support 142 from the first accommodating recess 18 by fingers.

Figure 3:
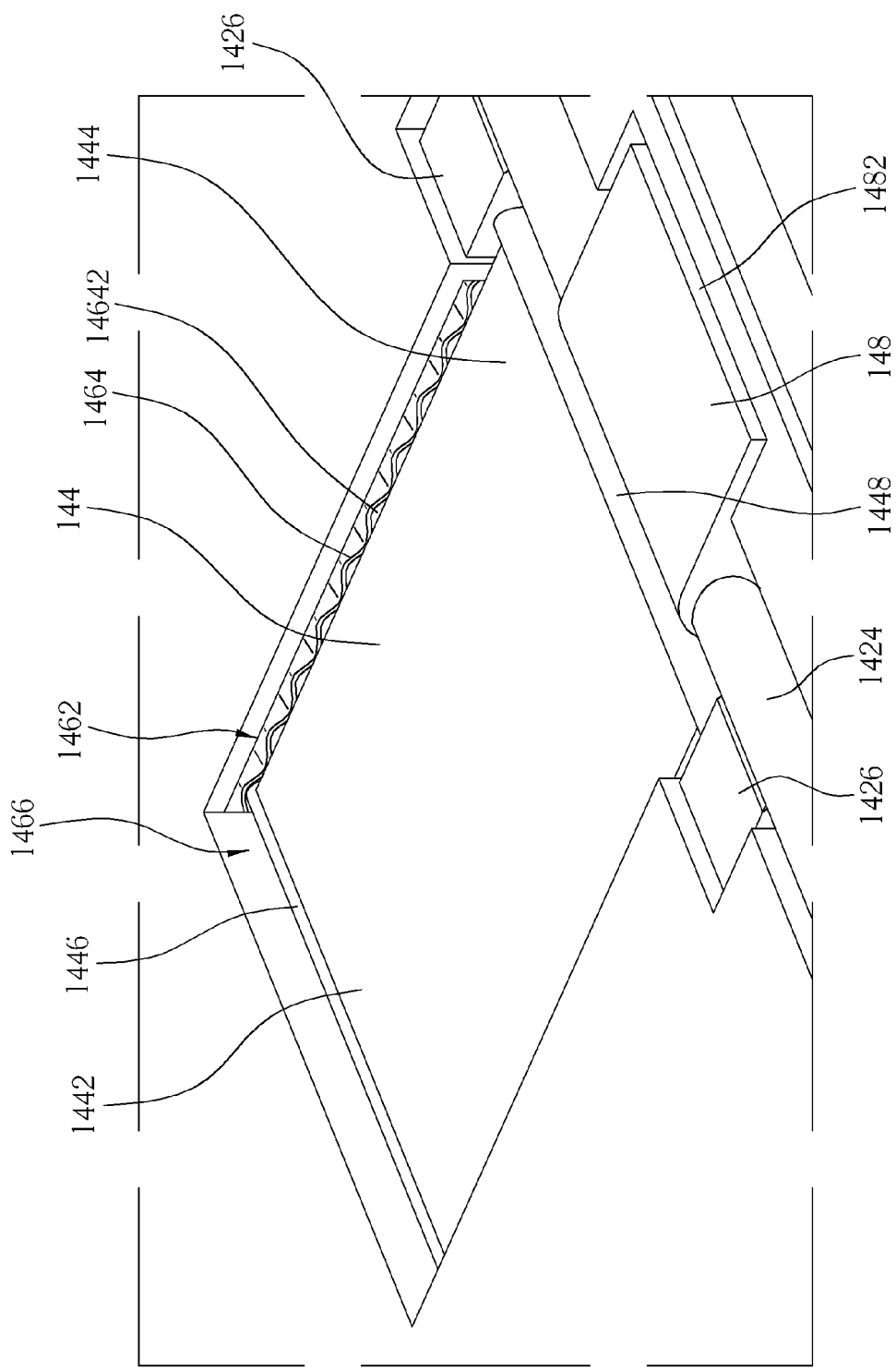
FIG. 3 is an enlarged view of a part of the peripheral input device in FIG. 1.

Please refer to FIG. 3, which is an enlarged view of a part of the peripheral input device 1. The positioning mechanism 146 is disposed within the surrounded area 182 on the base 12 and includes a slide 1462 on both sides and a waved spring 1464 disposed in each slide 1462. A second accommodating recess 1466 is formed between the two slides 1462. The waved springs 1464 can be made of metal to forming a plurality of fixing positions 14642, i.e. the constrained rooms formed by every arc portion of the waved springs 1464.

The second support 144 has a second lower end portion 1442 and a second upper end portion 1444. The second lower end portion 1442 is movably disposed in the slides 1462 and selectively fixed in one of the fixing positions 14642 by the waved springs 1464; therein, the constraining force on the second lower end portion 1442 is provided by the elasticity of the waved springs 1464. The second upper end portion 1444 is pivotally connected to the first support 142, so that when the first support 142 pivots on the first lower end portions 1422, the second support 144 is driven through the second upper end portion 1444 by the first support 142 so as to move the second lower end portion 1442 in the slides 1462, as shown by dashed lines in FIG. 2. In the embodiment, the second lower end portion 1442 includes a sliding rod 1446 movably disposed in the slides 1462; that is, the second lower end portion 1442 slides through the sliding rod 1446 in the slides 1462 and then is fixed in one of the fixing positions 14642 by the waved springs 1464.

The first support 142 includes a socket 1426 on the first upper end portion 1424. The second upper end portion 1444 of the second support 144 includes a shaft 1448, such that the second upper end portion 1444 is pivotally connected to the first support 142 by engaging the shaft 1448 to the socket 1426. As shown by the dashed lines in FIG. 2, when the first support 142 is loaded with an external force to be lifted by pivoting upward on the first lower end portions 1422, the first upper end portion 1424 drives the second support 144 through the second upper end portion 1444 so that the second lower end portion 1442 moves in the positioning mechanism 146. However, the invention is not limited thereto. For example, the socket 1426 is disposed on the vertical arms of the first support 142, or the pivotal connection of the second upper end portion 1444 with the first support 142 can be performed by a pin join.

In addition, when the first support 142 pivots downward on the first lower end portion 1422 to move the first support 142 toward the first accommodating recess 18, the first upper end portion 1424 drive the second support 144 through the second upper end portion 1444 so that the second lower end portion 1442 moves the positioning mechanism 146 and simultaneously makes the second support 144 move toward the second accommodating recess 1466. Thereby, when the second support 144 is accommodated in the second accommodating recess 1466, the second support 144 is surrounded on three sides by the first support 142.

The inputting module 17 is disposed on the surface 122 for allowing the user input data to a tabular electronic device 2. In the embodiment, the inputting module 17 is a keyboard, but the invention is not limited thereto. For example, a combination of a keyboard and a touch pad can be taken as the inputting module of the invention. The retaining structure 16 is disposed between the inputting module 17 and the supporting mechanism 14. The retaining structure 16 includes a retaining plate 162 and a third accommodating recess 164. The retaining plate 162 is capable of being moved upward to protrude out of the surface 122 to retain an object, as shown by dashed lines in FIG. 2. The retaining plate 162 is capable of being moved downward to be accommodated in the third accommodating recess 164.

Figure 4:
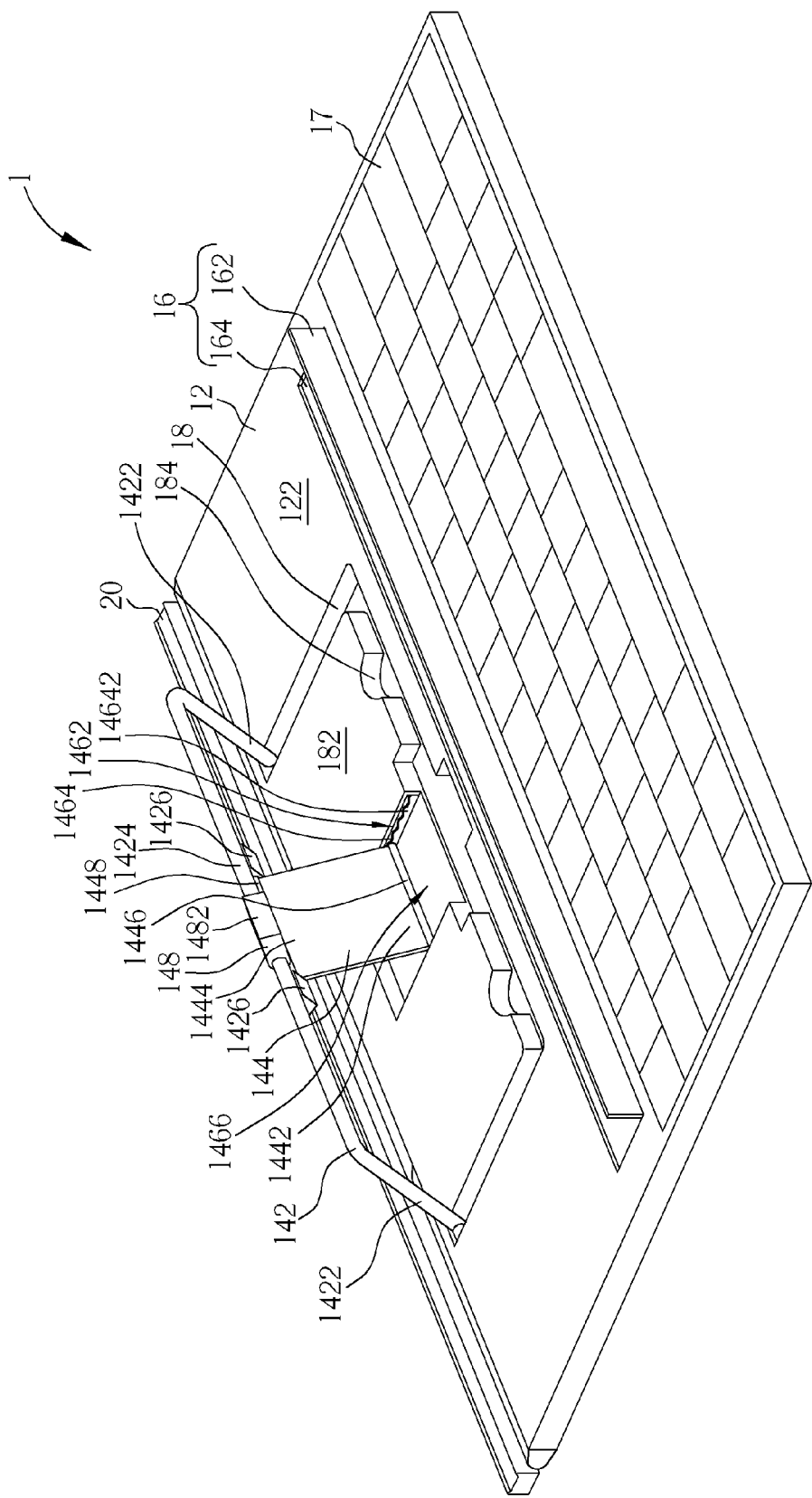
FIG. 4 is a schematic diagram illustrating the peripheral input device in FIG. 1 with the supporting mechanism and the retaining structure thereof being lifted.

In usage, the peripheral input device 1 is capable of carrying the tabular electronic device 2, for example a tablet computer, but the invention is not limited thereto. The tabular electronic device 2 has a bottom 22 and a back casing 24. The peripheral input device 1 mainly uses the supporting mechanism 14 and the retaining structure 16 to support the tabular electronic device 2 stably. The usage of supporting will be described in detail later. Please refer to FIG. 1 and FIG. 4. FIG. 4 is a schematic diagram illustrating the peripheral input device 1 in FIG. 1 with the supporting mechanism 14 and the retaining structure 16 being lifted. A user can hook the first upper end portion 1424 from the pulling-out operation space 184 and lift the first support 142 by pivoting on the first lower end portion 1422. Because the second upper end portion 1444 is pivotally connected to the first support 142, the second upper end portion 1444 is also lifted with the first support 142. The second lower end portion 1442 is driven by the second upper end portion 1444 to move in the slides 1462. After the first support 142 is rotated to a required angle, the first support 142 can be kept in the required angle due to the fixation of the waved springs 1464 to the second lower end portion 1442. Furthermore, the user can rotate the retaining plate 162 out the third accommodating recess 164. Then, the user can put the tabular electronic device 2 on the base 12 such that the screen 26 of the tabular electronic device 2 faces upward and the bottom 22 is retained by the retaining plate 162 of the retaining structure 16. Therein, in the embodiment, the tabular electronic device 2 is partially sunk in the third accommodating recess 164, but the invention is not limited thereto.

Figure 5:
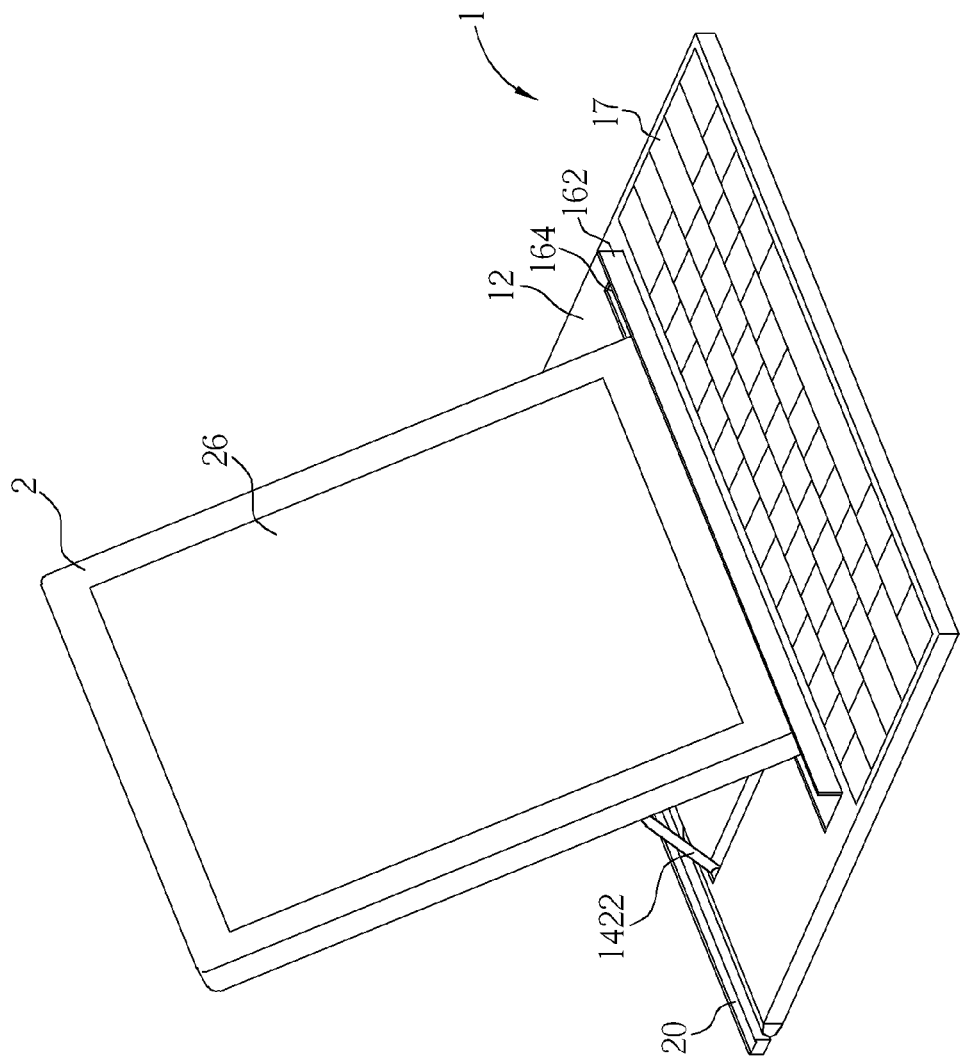
FIG. 5 is a schematic diagram illustrating the peripheral input device in FIG. 1 carrying a tabular electronic device.
Figure 6:
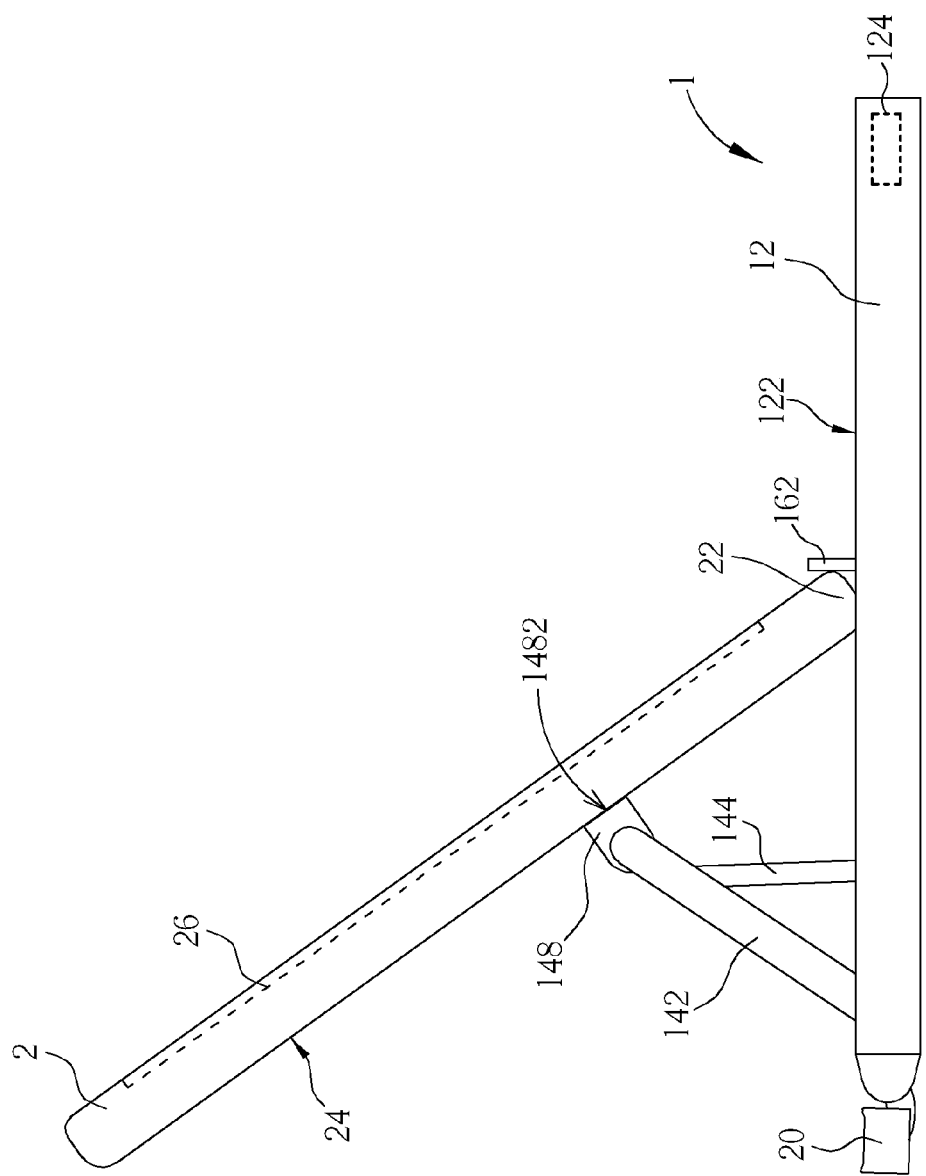
FIG. 6 is a side view of the peripheral input device in FIG. 5 carrying the tabular electronic device.

The user can also rotate the slip stopper 148 to fit the inclination angle of the back casing 24 so that the slip stopper 148 can keeps contacting the back casing 24 through the designated contact surface 1482 when the inclination angle of the back casing 24 changes. The designated contact surface 1482 in practice is substantially the top surface of the slip stopper 148. In this case, the tabular electronic device 2 has been supported stably by the peripheral input device 1, as shown in FIG. 5 and FIG. 6; therein, FIG. 6 is a side view thereof. Afterward, the user can perform input manipulation to the tabular electronic device 2 by use of the inputting module 17 of the peripheral input device 1. The peripheral input device 1 includes a wireless communication module 19 disposed in the base 12, as shown in FIG. 2. The wireless communication module 19 is capable of establishing wireless connection with the tabular electronic device 2 and transmitting electrical signals produced by the inputting module 17 to the tabular electronic device 2. However, the invention is not limited thereto; for example, the communication connection can be realized by connectors.

In addition, in FIG. 5 and FIG. 6, the rectangular tabular electronic device 2 is retained through its short edge by the retaining structure 16 so as to be vertically disposed. However, in practice, the tabular electronic device 2 also can be retained through its long edge by the retaining structure 16 so as to be horizontally disposed. It depends on the user's demand.

In the embodiment, the first support 142 and the second support 144 can form a stable supporting structure by use of the positioning function of the positioning mechanism 146. In practice, the force on the tabular electronic device 2 includes not only the gravity of the tabular electronic device 2 but also the reaction forces by the bottom of the third accommodating recess 164, the retaining plate 162, and the slip stopper 148. By analyzing the force diagram of the tabular electronic device 2, the supporting situation of the tabular electronic device 2 can be confirmed. Furthermore, the abovementioned action forces can be adjusted by modifying the dimensions of the components of the tabular electronic device 2 so as to obtain stable supporting for the tabular electronic device 2, which can be completed easily by a person of ordinary skill in the field according to the description of the invention, so it is not described further.

Figure 7:
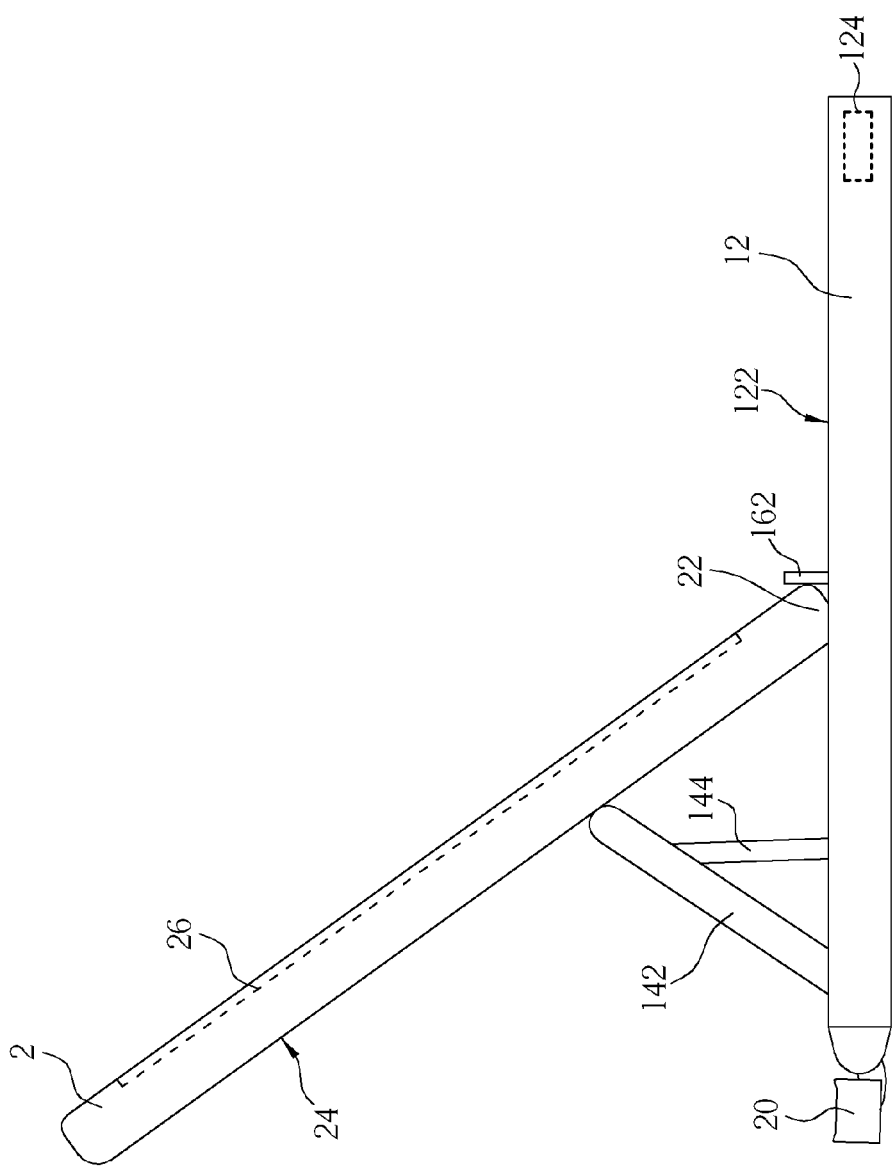
FIG. 7 is a side view of a peripheral input device carrying the tabular electronic device according to another embodiment.
Figure 8:
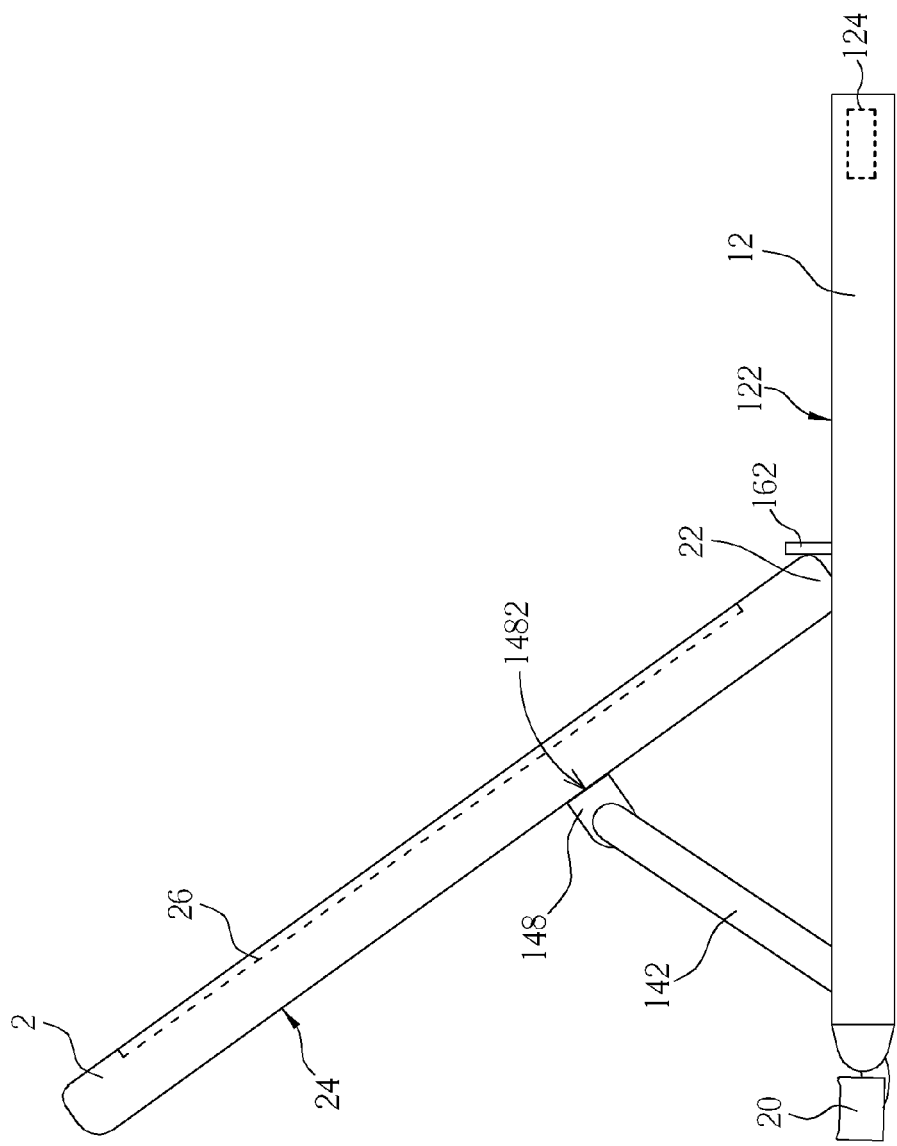
FIG. 8 is a side view of a peripheral input device carrying the tabular electronic device according to another embodiment.

It is added that, in the embodiment, the slip stopper 148 can be a friction pad, a sucker, a magnetic part, or a Velcro. When the Velcro is used for the slip stopper 148, the user needs to paste a matching Velcro on the back casing 24 of the tabular electronic device 2 corresponding to the slip stopper 148. Thereby, when the slip stopper 148 is attached on the back casing 24, the slip stopper 148 is immovable relative to the back casing 24. Furthermore, the friction pad, the sucker, the magnetic part, and the Velcro can increase the normal force or frictional force so as to adjust the resultant force on the tabular electronic device 2, which is conducive to stably supporting the tabular electronic device 2. In addition, if the reaction force by the first upper end portion 1424 on the tabular electronic device 2 is enough to stably supporting the tabular electronic device 2, i.e. the tabular electronic device 2 being stably supported by the base 12 and the first upper end portion 144, the slip stopper 148 can be omitted, as shown in FIG. 7. Therein, the first support 142 and the second support 144 can form the stable supporting structure by use of the positioning mechanism 146 without the structural interaction between the slip stopper 148 and the back casing 24. Further, the second support 144 in the embodiment also can be omitted if the resultant force on the tabular electronic device 2 is applicable to stably supporting. In this case, the first support 142 and the tabular electronic device 2 can form a reverse V-shaped structure by the non-slip effect of the slip stopper 148 to the back casing 24, so as to stably support the tabular electronic device 2, as shown in FIG. 8.

Figure 9:
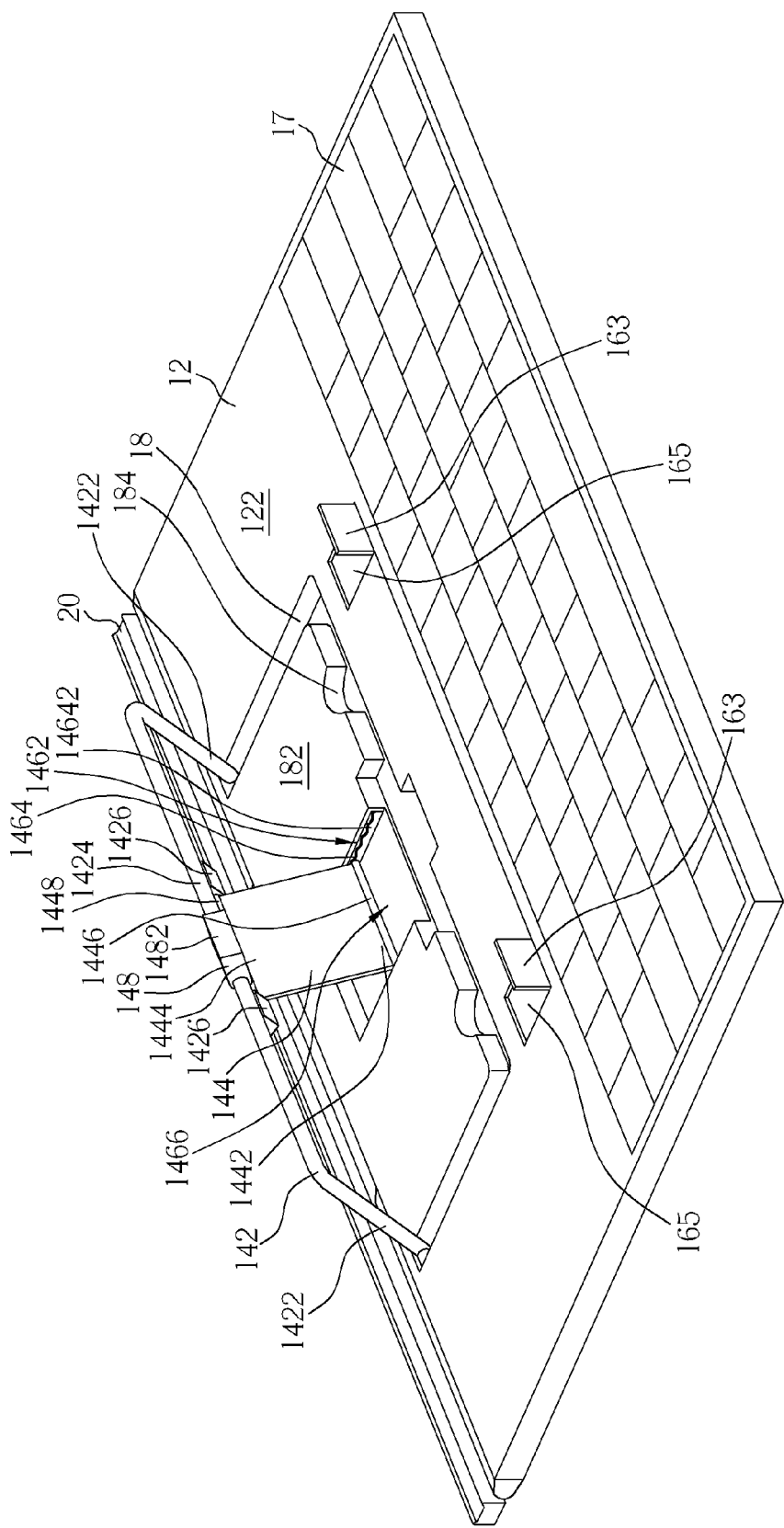
FIG. 9 is a schematic diagram illustrating a peripheral input device according to another embodiment.

In addition, in the embodiment, the disposition position of the retaining structure 16 is fixed, so the inclination angle of the disposed tabular electronic device 2 can be adjusted by changing the height of the first upper end portion 1424. In other words, the height of the first upper end portion 1424 can be adjusted by changing the fixing position of the second lower end portion 1442 in the fixing positions 14642, so as to change the inclination angle of the supported tabular electronic device 2 to satisfy the view demands of various users to the tabular electronic device 2. In addition, in the embodiment, the retaining structure 16 performs retaining the bottom 22 by the single, long and narrow retaining plate 162; however, the invention is not limited thereto. In another embodiment, the single retaining plate 162 is replaced with two shorter retaining plates 163 to perform retaining the bottom 22, as shown in FIG. 9; besides, the third accommodating recess 164 is replaced by two corresponding accommodating recesses 165. In this case, the area occupied by the recesses 165 is smaller, so the case 12 can reserve more space inside for disposing other electronic components.

Figure 10:
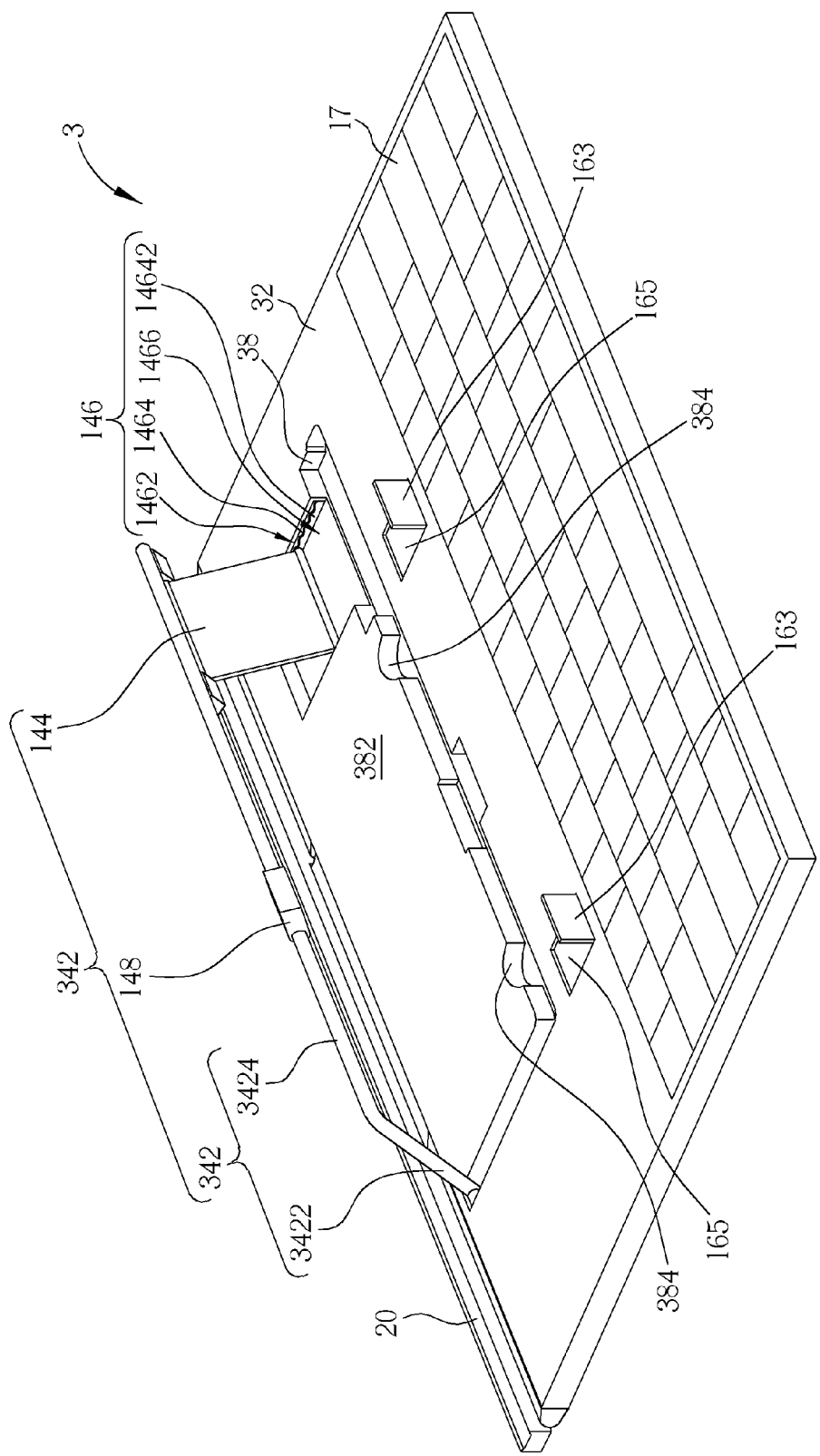
FIG. 10 is a schematic diagram illustrating a peripheral input device of another preferred embodiment according to the present invention.

In the above embodiments, the first support 142 includes a U-shaped structure, so there are two pivotal connections between the first support 142 and the base 12, which enhances the action stability of the first support 142; however, the invention is not limited thereto. Please refer to FIG. 10, which is a schematic diagram illustrating a peripheral input device 3 of another preferred embodiment according to the present invention. The peripheral input device 3 is similar to the peripheral input device 1 in structure. The main difference is that the first support 342 of the supporting mechanism 34 of the peripheral input device 3 is L-shaped. The first support 342 consists mainly of a vertical arm and a horizontal arm, so the first support 342 includes only a first lower end portion 3422 pivotally connected to the base 32. The second support 144 is pivotally connected to an end portion of the first upper portion 3424 of the first support 342. The slip stopper 148 also is pivotally connected about to the middle portion of the first upper portion 3424. The first accommodating recess 38 is L-shaped to correspond to the profile of the first support 342 and defines a surrounded area 382, i.e. the area substantially surrounded by the L-shaped first accommodating recess 38. The positioning mechanism 146 is disposed within the surrounded area 382 on the base 32. When the first support 342 is accommodated in the first accommodating recess 38, the second support 144 is surrounded on two sides by the first support 342. The first accommodating recess 38 also includes a pulling-out operation space 384 conducive to a user taking out the first support 342 from the accommodating recess 38 by a finger. Although the supporting structure formed by the first support 342 and the second support 144 is asymmetric, the stability of the supporting structure is still practicable and the base 32 can reserve more space conducive to disposing other components such as battery, circuit board and so on. In addition, the peripheral input device 3 also uses the retaining plate 163 in FIG. 9. For other description for the components of the peripheral input device 3, please refer to the relative descriptions in the above embodiments, which are not repeated herein.

Figure 11:
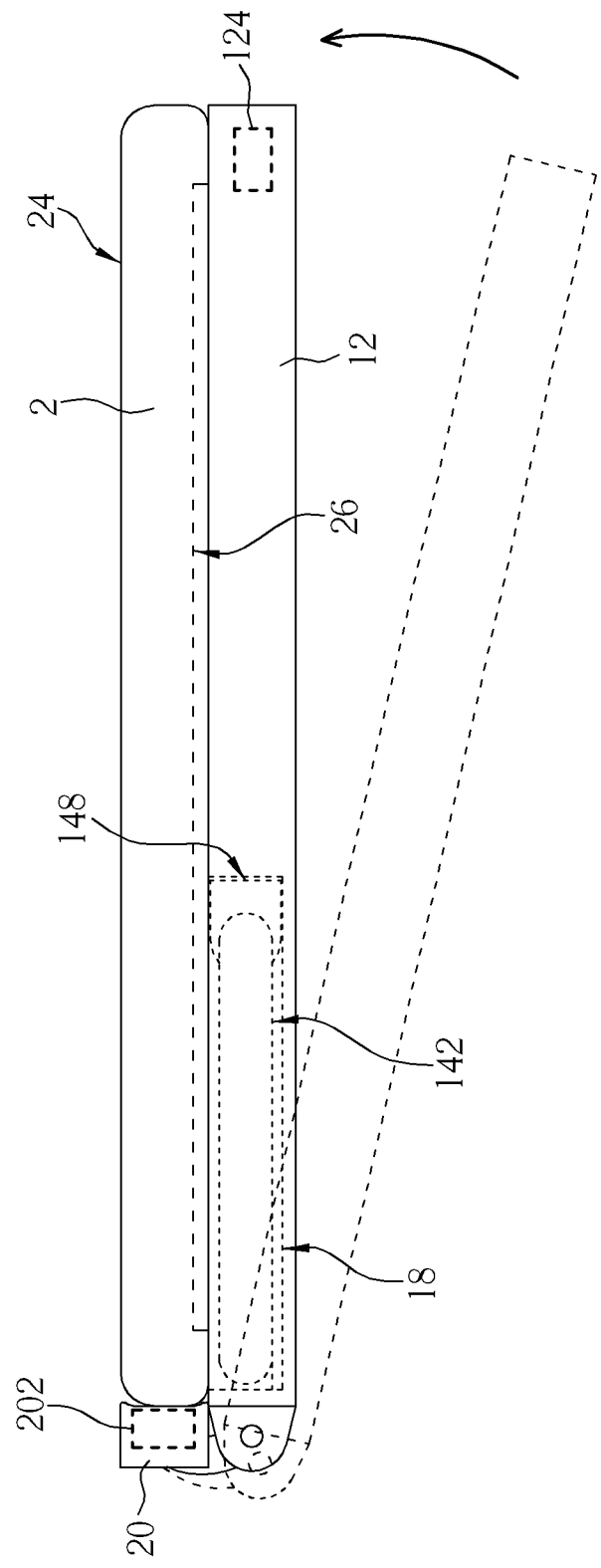
FIG. 11 is a side view of the peripheral input device in FIG. 1 covering the tabular electronic device.

In the above embodiments, the peripheral input devices 1 and 3 can be used to support the tabular electronic device 2 and also can be regarded as protection covers for covering the tabular electronic device 2. Please refer to FIG. 1 and FIG. 11. FIG. 11 is a side view of the peripheral input device 1 covering the tabular electronic device 2. The base 12 includes a hinge 20 and is pivotally connected to the tabular electronic device 2 through the hinge 20 so that the peripheral input device 1 can rotate about the first side to flatly cover the screen 26 of the tabular electronic device 2 for protection. In the embodiment, the hinge 20 includes two first magnetic parts 202, the positions of which are shown by bold lines in FIG. 1 and FIG. 11. When the tabular electronic device 2 has a metal casing at its side, the hinge 20 can magnetically attract the tabular electronic device 2 through magnetic parts 202. Or the tabular electronic device 2 includes magnetic parts (such as magnets) correspondingly, and then the hinge 20 also can magnetically attract the tabular electronic device 2 by use of the magnetic parts 202. Therefore, the hinge 20 can be joined with the first side of the tabular electronic device 2 through the first magnetic parts 202, so that the base 12 is pivotally connected to the tabular electronic device 2 through the hinge 20 and the peripheral input device 1 can rotate around the first side. In addition, in the embodiment, the hinge 20 is attached on the long side of the tabular electronic device 2, but the invention is not limited thereto. The abovementioned description is also applicable to the peripheral input device 3 and is not repeated herein.

In addition, in the embodiment, there is a second magnetic part 124 (such as magnet) disposed in the base 12, the position of which is about under the space key of the inputting module 17 and is shown by bold lines in FIGS. 6 through 8 and 11. Therefore, when the base 12 covers the tabular electronic device 2, the magnetic part 124 magnetically attracts the tabular electronic device 2, which assists the fixation between the peripheral input device 1 and the tabular electronic device 2. In practice, the inputting module 17 can be a thin keyboard. In this case, the magnetic part 124 can be disposed closer to the surface 122 of the base 12, and the magnetic attraction between the magnetic part 124 and the tabular electronic device 2 is enhanced. Therefore, when the tabular electronic device 2 includes a first side and a second side and the user makes the first magnetic parts 202 attract the first side and the second magnetic part 124 attract the second side, the peripheral input device 1 can keep being fixed flatly on the tabular electronic device 2 unless the peripheral input device 1 is loaded with an external force larger than magnetic attraction force of the first magnetic parts 202 or the second magnetic part 124.

Figure 12:
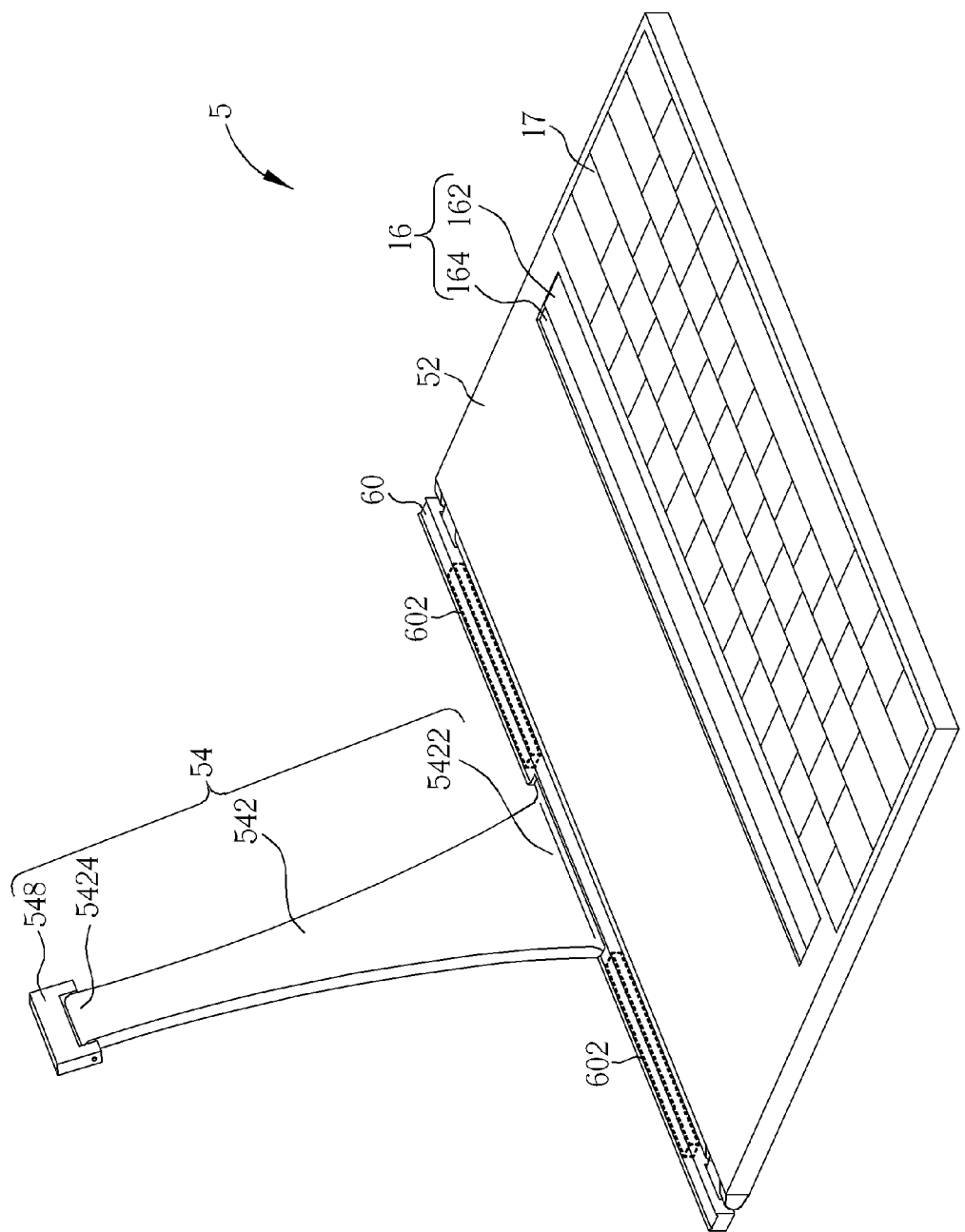
FIG. 12 is a schematic diagram illustrating a peripheral input device of another preferred embodiment according to the present invention.
Figure 13:
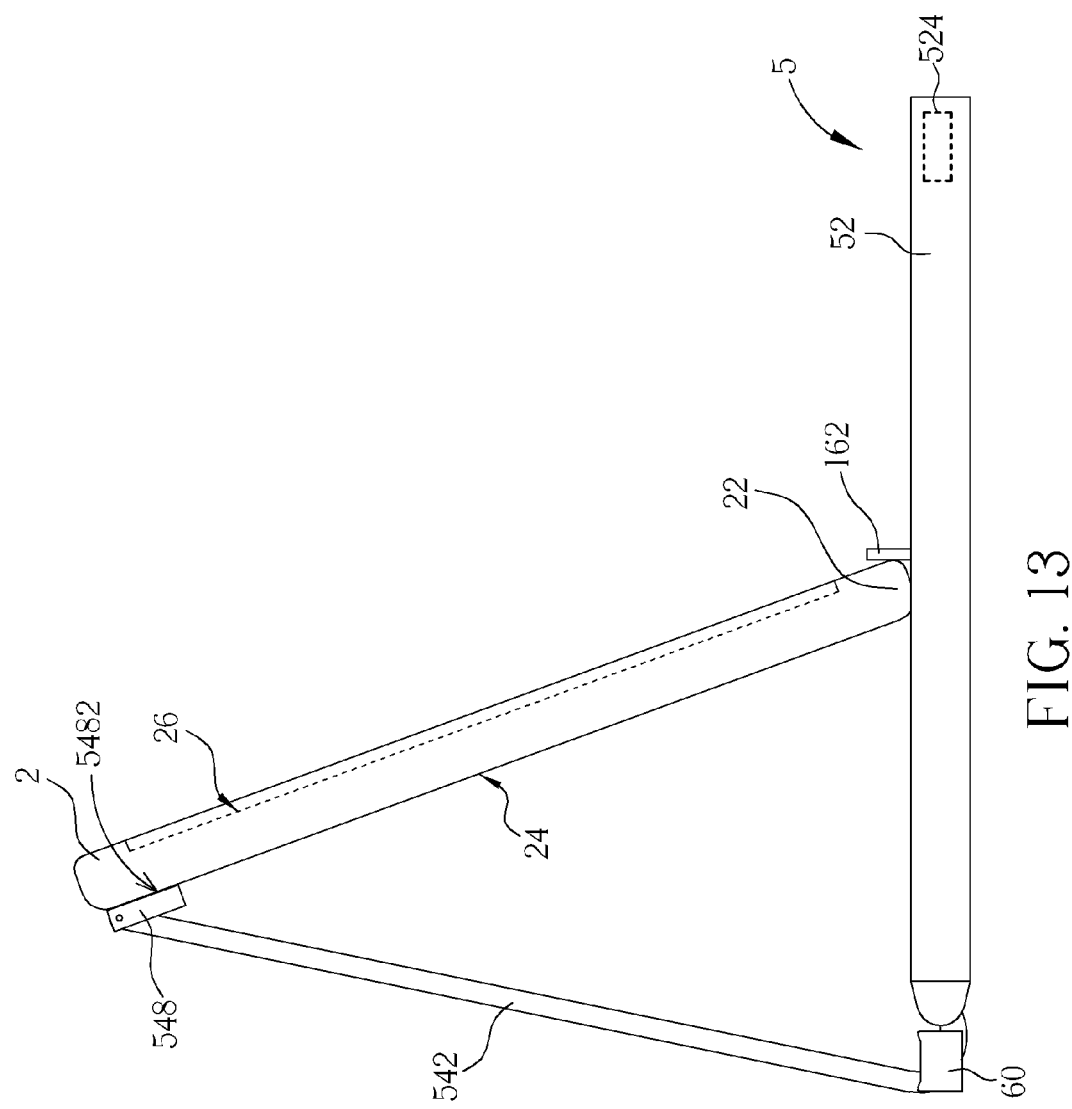
FIG. 13 is a side view of the peripheral input device in FIG. 12 carrying the tabular electronic device.

Please refer to FIG. 12, which is a schematic diagram illustrating a peripheral input device 5 of another preferred embodiment according to the present invention. The peripheral input device 5 is similar to the peripheral input device 1 in structural logic; however, the supporting mechanism 54 of the peripheral input device 5 is integrated with the hinge 60 thereof, so the supporting mechanism 54 has the longer first support 542 for obtaining better supporting architecture. In the embodiment, the first lower end portion 5422 of the first support 542 is pivotally connected to the hinge 60. The slip stopper 548 of the supporting mechanism 54 is pivotally connected to the first upper end portion 5424 of the first support 542. In practice, the slip stopper 548 can be a friction pad, a sucker, a magnetic part, or a Velcro. When the Velcro is used for the slip stopper 548, the user needs to paste a matching Velcro on the back casing 24 of the tabular electronic device 2 corresponding to the slip stopper 548. In the embodiment, the slip stopper 548 can be totally made of magnet. In usage, the user also can rotate the retaining plate 162 out of the third accommodating recess 164, make the bottom 22 of the tabular electronic device 2 be retained by the retaining plate 162, rotate the first support 542 to a required angle, and make the slip stopper 548 magnetically attract the back casing 24. The operation of supporting the tabular electronic device 2 by use of the peripheral input device 5 is completed; the side view therefor is shown in FIG. 13. In FIG. 13, the slip stopper 548 is located close to an edge of the back casing 24 through its designated contact surface 5482, but in practice, it is not limited thereto. When the slip stopper 548 is located toward the middle portion of the back casing 24, the peripheral input device 5 can provide a more vertical disposition angle. In addition, the supporting mechanism 54 is integrated with the hinge 60, so the base 52 can reserve more space between the hinge 60 and the retaining structure 16 for internal components, especially for a battery which usually needs a larger space to dispose.

Figure 14:
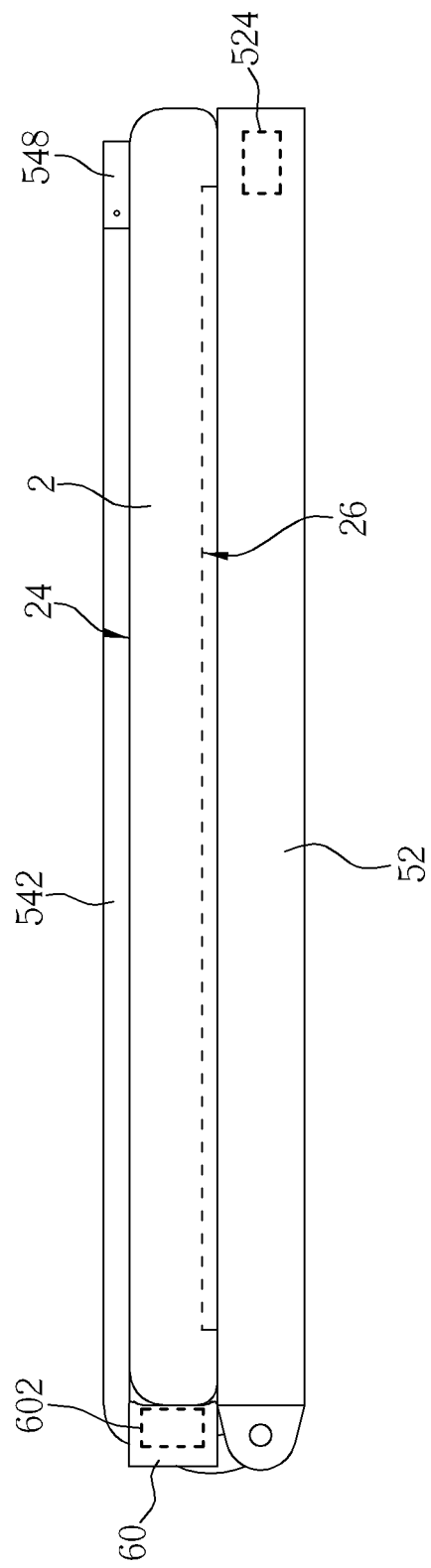
FIG. 14 is a side view of the peripheral input device in FIG. 12 covering the tabular electronic device.

Please refer to FIG. 12 and FIG. 14. FIG. 14 is a side view of the peripheral input device 5 covering the tabular electronic device 2. In the embodiment, the hinge 60 through the first magnetic part 602 (the position of which is indicated by bold lines in FIG. 12 and FIG. 14) magnetically attracts the first side of the tabular electronic device 2, so that the base 52 is pivotally connected to the tabular electronic device 2 through the hinge 60 and the peripheral input device 5 can rotate relative to the first side of the tabular electronic device 2.

When the user does not need inputting text but wants to take the peripheral input device 5 as a protection cover for the screen of the tabular electronic device 2, the user can just use the peripheral input device 5 to flatly cover the tabular electronic device 2 such that the first magnetic part 602 magnetically attracts the first side of the tabular electronic device 2 and the second magnetic part 524 (the position of which is indicated by bold lines in FIG. 12 and FIG. 14) magnetically attracts the second side of the tabular electronic device 2, and the user can make the slip stopper 548 magnetically attract the back casing 24 of the tabular electronic device 2 close to the second side. Therefore, the base 52 and the first support 542 can be fixed on the tabular electronic device 2 for providing protection in a certain degree to the tabular electronic device 2 unless the base 52 and the first support 542 is loaded with an external force larger than magnetic attraction force of the first magnetic part 602, the second magnetic part 524, or the slip stopper 548. In addition, for other description for the components of the peripheral input device 5, please refer to the relative descriptions in the above embodiments, which are not repeated herein. The slip stopper 548 can be a sucker, a Velcro, or other mechanism capable of providing connecting force between the first support 542 and the back casing 24.

As discussed in the above the embodiments, the peripheral input device of the invention can use the positioning mechanism so as to form a stable supporting structure by the first support and the second support, and further with the retaining structure to support the tabular electronic device stably, which solves the problem in the prior art of supporting a tablet computer when an external keyboard is used. Furthermore, the peripheral input device can use the positioning mechanism to also provide a plurality of fixing positions to adjust the height of the supporting structure so that the tabular electronic device can be disposed in various inclination angle, which satisfies the view demand of the user to the tabular electronic device to solves the problem in the prior art that an external keyboard with supporting structure only provides a single supporting angle. In addition, the peripheral input device of the invention can use the non-slip connection between the slip stopper and the tabular electronic device to form a stable reverse V-shaped structure by the first support and the tabular electronic device and further with the retaining structure to stably support the tabular electronic device. The inclination angle of the disposed tabular electronic device can be set by adjusting the position where the slip stopper contacts the back casing of the tabular electronic device. Furthermore, the peripheral input device can use the inputting module such as keyboard to provide a better manipulation feeling for users. The peripheral input device can use the hinge to make the base and the tabular electronic device are pivotally connected thereby, so as to be able to cover the tabular electronic device to be a protection cover for the tabular electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A peripheral input device capable of carrying a tabular electronic device, the tabular electronic device having a bottom and a back casing, the peripheral input device comprising:
   a base having a surface;
   an inputting module disposed on the surface for allowing a user input data to the tabular electronic device;
   a supporting mechanism comprising a first support and a slip stopper, a first lower end portion of the first support being pivotally connected to the base, a first upper end portion of the first support being pivotally connected to the slip stopper, such that the slip stopper is capable of rotating on the first upper end portion, the slip stopper having a designated contact surface; and
   a retaining structure disposed between the inputting module and the supporting mechanism;
   wherein when the bottom of the tabular electronic device is retained by the retaining structure, and the first support is lifted by pivoting upward on the first lower end portion, the slip stopper is rotated to fit an inclination angle of the back casing so that the slip stopper keeps contacting the back casing through the designated contact surface when the inclination angle of the back casing changes, and the first support and the tabular electronic device form a reverse V-shaped structure to support the tabular electronic device stably.

2. The peripheral input device of claim 1, wherein the base has a first accommodating recess formed on the surface, the first support pivots downward on the first lower end portion so that the first support and the slip stopper is capable of being accommodated in the first accommodating recess.

3. The peripheral input device of claim 2, wherein the first accommodating recess has a pulling-out operation space conducive to taking out the first support from the first accommodating recess for a user.

4. The peripheral input device of claim 1, wherein the first support is U-shaped or L-shaped and has at least one vertical arm and a horizontal arm, the first upper end portion corresponds to the horizontal arm, and the slip stopper is pivotally connected to the horizontal arm to be capable of being rotated around the horizontal arm.

5. The peripheral input device of claim 1, wherein the supporting mechanism further comprises a second support and a positioning mechanism disposed on the base, the positioning mechanism has a plurality of fixing positions, a second upper end portion of the second support is pivotally connected to the first support, and a second lower end portion of the second support is capable of being selectively fixed in one of the fixing positions.

6. The peripheral input device of claim 5, wherein the positioning mechanism comprises a slide and a waved spring disposed in the slide, the waved spring is used for forming the fixing positions, the second lower end portion of the second support comprises a sliding rod, and the second lower end portion slides in the slide to be fixed in one of the fixing positions by the waved spring through the sliding rod.

7. The peripheral input device of claim 1, wherein the retaining structure comprises a retaining plate and a third accommodating recess, when the tabular electronic device is carried on the base, the retaining plate is capable of being moved upward to protrude out of the surface of the base to retain the bottom of the tabular electronic device, and the retaining plate is capable of being moved downward to be accommodated in the third accommodating recess.

8. The peripheral input device of claim 1, wherein the slip stopper is a friction pad, a sucker, a magnetic part, or a Velcro, and when the slip stopper is attached on the back casing, the slip stopper is immovable relative to the back casing.

9. The peripheral input device of claim 1, wherein the base comprises a hinge and a first magnetic part, the tabular electronic device comprises a first side, and the hinge is capable of being joined with the first side by the first magnetic part, so that the base is pivotally connected to the tabular electronic device through the hinge to make the peripheral input device be able to be rotated substantially around the first side.

10. The peripheral input device of claim 1, wherein the base comprises a first magnetic part and a second magnetic part, the tabular electronic device comprises a first side and a second side, the first magnetic part magnetically attracts the first side, the second magnetic part magnetically attracts the second side, and the peripheral input device keeps being fixed on the tabular electronic device unless the peripheral input device is loaded with an external force larger than magnetic attraction force of the first magnetic part or the second magnetic part.

11. The peripheral input device of claim 10, wherein when the peripheral input device flatly covers the tabular electronic device, the slip stopper keeps being joined with the back casing so that the first support is fixed on the back casing of the tabular electronic device.

12. A peripheral input device capable of carrying a tabular electronic device, the tabular electronic device having a bottom and a back casing, the peripheral input device comprising:
  a base having a surface;
  an inputting module disposed on the surface for allowing a user input data to the tabular electronic device;
  a first accommodating recess formed on the surface and defining a surrounded area;
  a supporting mechanism comprising a first support, a second support, and a positioning mechanism, a first lower end portion of the first support being pivotally connected to the base, a second upper end portion of the second support being pivotally connected to the first support, a second lower end portion of the second support being selectively fixed in the positioning mechanism, the positioning mechanism being disposed within the surrounded area; and
  a retaining structure disposed between the inputting module and the supporting mechanism;
wherein when the bottom of the tabular electronic device is retained by the retaining structure, the first support is lifted by pivoting upward on the first lower end portion, and the second lower end portion is fixed in the positioning mechanism, the tabular electronic device is supported stably by the base and a first upper end portion of the first support; and
wherein the first support comprises at least a U-shaped or L-shaped structure, and when the first support pivots downward on the first lower end portion so that the first support is accommodated in the first accommodating recess, the second support is surrounded on at least two sides by the first support.

13. The peripheral input device of claim 12, wherein the positioning mechanism has a plurality of fixing positions disposed on the base, the second lower end portion of the second support is capable of being fixed in one of the fixing positions, and a height of the first upper end portion is capable of being adjusted by fixing the second lower end portion in different positions of the fixing positions, so as to adjust an inclination angle of the supported tabular electronic device.

14. The peripheral input device of claim 13, wherein the supporting mechanism further comprises a slip stopper having a designated contact surface and pivotally connected to the first upper end portion of the first support, such that when the bottom is retained by the retaining structure, the slip stopper is rotated to fit an inclination angle of the back casing so that the slip stopper keeps contacting the back casing through the designated contact surface when the inclination angle of the back casing changes.

15. The peripheral input device of claim 14, wherein when the peripheral input device flatly covers the tabular electronic device, the slip stopper keeps being joined with the back casing so that the first support is fixed on the back casing of the tabular electronic device.

16. The peripheral input device of claim 14, wherein the slip stopper is a friction pad, a sucker, a magnetic part, or a Velcro, and when the slip stopper is attached on the back casing, the slip stopper is immovable relative to the back casing.

17. The peripheral input device of claim 12, wherein the positioning mechanism comprises a slide and a waved spring disposed in the slide, the waved spring is used for forming a plurality of fixing positions, the second lower end portion comprises a sliding rod, and the second lower end portion slides in the slide to be fixed in one of the fixing positions by the waved spring through the sliding rod.

18. The peripheral input device of claim 12, wherein the retaining structure comprises a retaining plate and a third accommodating recess, when the tabular electronic device is carried on the base, the retaining plate is capable of being moved upward to protrude out of the surface of the base to retain the bottom of the tabular electronic device, and the retaining plate is capable of being moved downward to be accommodated in the third accommodating recess.

19. The peripheral input device of claim 12, wherein the base comprises a hinge and a first magnetic part, the tabular electronic device comprises a first side, and the hinge is capable of being joined with the first side by the first magnetic part, so that the base is pivotally connected to the tabular electronic device through the hinge to make the peripheral input device be able to be rotated substantially around the first side.

20. The peripheral input device of claim 12, wherein the base comprises a first magnetic part and a second magnetic part, the tabular electronic device comprises a first side and a second side, the first magnetic part magnetically attracts the first side, the second magnetic part magnetically attracts the second side, and the peripheral input device keeps being fixed on the tabular electronic device unless the peripheral input device is loaded with an external force larger than magnetic attraction force of the first magnetic part or the second magnetic part.

* * * * *